United States Patent

Jacoby et al.

[15] 3,658,541
[45] Apr. 25, 1972

[54] PHOTOGRAPHIC SUBBING MATERIALS

[72] Inventors: Frederick J. Jacoby; Frederick L. Hamb; Lewis C. Trent, all of Rochester, N.Y.

[73] Assignee: Eastman Kodak Company, Rochester, N.Y.

[22] Filed: Oct. 9, 1969

[21] Appl. No.: 865,184

[52] U.S. Cl. .................. 96/87, 260/75 R, 260/76, 260/33.4 R
[51] Int. Cl. ............................................ G03c 1/80
[58] Field of Search ............... 46/87; 260/75 R, 75 T, 76, 260/33.4 R

[56] References Cited

UNITED STATES PATENTS

| | | | |
|---|---|---|---|
| 3,360,543 | 12/1967 | Hoy | 260/76 X |
| 3,397,254 | 8/1968 | Wynstra et al. | 260/75 X |
| 3,434,840 | 3/1969 | De Keyser et al. | 96/87 |
| 3,459,584 | 8/1969 | Caldwell | 260/75 X |
| 3,460,982 | 8/1969 | Appelbaum | 96/87 |
| 3,495,984 | 2/1970 | Vanpoecke | 96/87 |

*Primary Examiner*—John T. Goolkasian
*Assistant Examiner*—Joseph C. Gil
*Attorney*—Walter O. Hodson and Dwight J. Holter

[57] ABSTRACT

Solvent soluble carboxylated polyester subbing materials for photographic elements. An organic solvent soluble polyester is carboxylated by treatment, during the latter stages of polymerization, with an organic dianhydride to produce an organic solvent soluble carboxylated polyester. The solvent soluble carboxylated polyester is effectively used in subbing compositions, desirably containing attack solvent, e.g., coated onto a polyester photographic film support and has excellent adhesion both to support and to conventional gelatin-cellulose ester subbing layers used to adhere a gelatino silver halide emulsion to the support.

2 Claims, No Drawings

PHOTOGRAPHIC SUBBING MATERIALS

This invention relates to compositions for rendering gelatinous compositions adherent to polyester supports. In one of its aspects this invention relates to photographic supports and to the preparation of materials useful in photographic supports. In another of its aspects this invention relates to photographic elements and methods for the preparation of photographic elements.

It is known in the art to coat gelatino silver halide emulsions on various supports including film supports. Plastic film supports, due to their dimensional stability, flexibility, clarity, and other physical properties constitute a class of known film supports. Of the many plastic film supports suitable in photography, polyesters such as polyethylene terephthalate are excellent. However, it is generally difficult to adhere a hydrophilic gelatin-containing emulsion on a hydrophobic polyester support. In the past there have been several attempts to overcome this problem among the most successful of which is the interposition of one or more subbing layers between the polyester support and the gelatin-containing emulsion. Although solvent solutions of polymeric compounds have been reported, these subbing layers have normally involved an aqueous dispersion of the subbing compositions which is applied to the support material. Even with relative success of prior products the seemingly ever increasing demand for new and better products at reasonable cost has stimulated extended research to find subbing compositions which can be utilized more effectively and efficiently.

We have found that carboxylated, organic solvent soluble polyesters are provided by reacting, under polymerizing conditions, an organic diacid constituent with a glycol constituent and, optionally, at least one modifying agent selected from the group consisting of organic diacids and diols, said modifying agent being different from said diacid constituent and said glycol constituent, to destroy the regularity of the polymer molecule, to produce an organic solvent soluble polyester polymer, and, during the latter stages of the process, introducing up to 10 mole percent, based on the total amount of said acid constituent and acid modifying agent, of an organic dianhydride, to produce a carboxylated, organic solvent soluble polyester.

Organic solvent solutions of such dianhydride modified polyesters advantageously also containing an effective amount of polyester attack agent are advantageously utilized as subbing compositions, which tenaciously adhere gelatinous layers to polyester supports. Photographic elements prepared using such dianhydride modified polyester subbing compositions desirably comprise a polyester support, a gelatin-cellulose ester (desirably nitrate) photographic subbing layer, a gelatino-silver halide emulsion layer on said gelatin-cellulose ester layer, and the dianhydride modified (carboxylated) organic solvent-soluble polyester subbing layer bonding said gelatin-cellulose ester layer to said polyester support, said carboxylated polyester being the reaction product of an organic solvent soluble polyester and up to 10 mole percent, based on the amount of acid constituents, of an organic dianhydride.

According to one advantageous embodiment of the present invention the organic solvent soluble polyester is the polymeric reaction product of an organic diacid and a glycol having an average molecular weight of at least about 6,000 to about 25,000 and desirably from about 10,000 to 25,000.

The acid constituent can be any dibasic organic acid capable of polymerization with a linear glycol having from two to six carbon atoms. Suitable dibasic acids include the aliphatic, cycloaliphatic and aromatic types such as adipic acid, suberic acid, sebacic acid, and other aliphatic dicarboxylic acids, 1,3-cyclohexanedicarboxylic acid, 1,4-cyclohexanedicarboxylic acid and other alicyclic acids, isophthalic acid, terephthalic acid, 2,6-naphthalenedicarboxylic acid, and other single or fused ring aromatic diacids. Polyesters made from these diacids are made by either direct esterification or transesterification techniques and, in the latter instance, lower alkyl diesters of the diacids are utilized. The methyl and ethyl diesters are preferred. In any event, the terms "acids," "diacids," and the like as used herein to define the polyester constituent which is condensed with the glycol, includes lower alkyl diesters of the diacids as well as the acids per se.

The glycol constituent making up the polyester is desirably a linear aliphatic glycol having from two to six carbon atoms. Ethylene glycol is especially useful.

The choice of some glycol-acid combinations for preparation of the polyesters, according to one embodiment of the present invention, such as ethylene glycol and isophthalic acid result in polymers which are soluble in methylene chloride and can be employed without further modification. However, some acid-glycol combinations can result in polyesters which have less than desired solubility. In such situations it is advantageous to incorporate one or more modifying agents which destroy the regularity of the polymer molecule. According to a highly advantageous embodiment of the present invention, even in those instances where the choice of acid and glycol is such that the polyester would be sufficiently soluble in methylene chloride, the resulting polyester can be made even more soluble by the incorporation of such modifying agents. The modifying agent is desirably selected from organic diacids and diols. The amount of modifying agent can vary widely but will generally be not more than 50 mole percent of the total acid constituents in the case of diacid modifiers and not more than 50 mole percent in the total glycol constituents in the case of diol modifiers. The minimum amount of the modifiers will vary widely but will in general be an amount sufficient to achieve a polyester which is soluble in methylene chloride. A practical minimum is about 10 mole percent based on the total amount of glycol or acid as the case may be.

The diol modifier is an organic diol copolymerizable with the other polymer constituents and different in structure from the main glycol constituent. Suitable diol modifiers include aliphatic glycols including both straight chain glycols preferably of three to 10 carbon atoms and branched chain glycols preferably of five to 15 carbon atoms such as neopentyl glycol and 2-n-butyl-2-ethyl-propane-1,3-diol; alicyclic diols containing from four to 20 carbon atoms such as 1,4-cyclohexanedimethanol, 2,2,4,4-tetramethylcyclobutane-1,3-diol, and 2,2-norbornandedimethanol; hydroxy terminated polyethers of low molecular weight such as about 200 to about 2,000; and hydroxy terminated compounds with other internal functional groups such as a carbonyl group or an ester group or the anhydride group

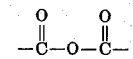

of a compound such as hydroxypivalyl hydroxypivalate.

The acid modifier is an organic dicarboxylic acid copolymerizable with the other polymer constituents and different in structure from the main acid constituent. Suitable acids include linear and branched aliphatic acids of any number of carbon atoms such as sebacic acid and di-n-butylmalonic acid; alicyclic diacids such as 1,3- or 1,4-cyclohexanedicarboxylic acid; aromatic acids having a single ring such as terephthalic and isophthalic acid; or fused rings such as 2,6-naphthalene-dicarboxylic acid; and substituted aromatic acids such as halogen substituted aromatics such as 2,5-dichloroterephthalic acid.

While in general, only a single modifier molecule is introduced into the polymer backbone, it is, of course, possible to introduce more than one diol modifier or acid modifier and it is further possible to introduce one or more diol modifiers together with one or more acid modifiers. The function of the modifier is to increase solvent solubility or to render the polymer appreciably soluble in methylene chloride. In order to achieve this, it is sufficient to introduce a single modifier and this is preferred since fewer reagents are used. However, the use of several modifiers does not in any way impair solubility and the use of a plurality of modifiers is thus within the scope of the invention.

Carboxylated polymers are prepared according to the invention by introducing an organic dianhydride reactant toward the end of the polymerization of the organic solvent-soluble polyester described above. The carboxylated polyesters are prepared by polymerizing the basic acid and glycol constituents and the optional modifying constituent by known techniques and then adding the dianhydride during the latter stages of the process. During the latter stages, the polymer molecular weight preferably appears to lie in the range 10,000–25,000.

Although the polyesters can be formed by any standard melt techniques, one advantageous method is to prepare the carboxylated polyesters by polymerizing the basic acid constituent and all but a small portion of one or the other or both the basic glycol and the optional modifying constituent, adding the remaining glycol to the reaction mixture during the latter stages of the reaction, and finally adding the dianhydride before termination of the reaction. The glycolyzing step in this procedure causes the formation of lower molecular weight polymers and insures their termination prior to addition of the dianhydride by hydroxyl groups. In general, the presence of hydroxy termination is ensured by using a molar excess of glycol to diacid of preferably at least 25 to 50 mole percent.

The dianhydride as mentioned is added in the late stages of the polymerization. In an exceptionally advantageous embodiment of the invention, the dianhydride is added to the desired polyester melt at temperatures in the range 400°–475° F. Higher temperatures lead to undesireable crosslinking while at lower temperatures the viscosity of the polymer is often such that it is difficult to assure adequate mixing. The time of mixing from first addition of dianhydride, for maximum efficiency, is usually from about 5 to about 15 minutes. Longer times tend to result in crosslinked products and shorter times occasionally result in unsatisfactory mixing.

The dianhydrides utilized according to the present invention can vary widely in structure but are advantageously monomeric organic dianhydrides desirably having the formula:

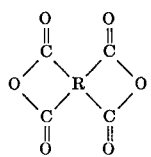

wherein R is a tetravalent organic radical containing from about four to about 30 carbon atoms and advantageously at least one

linkage and/or an oxygen atom. For example, R can be a tetravalent organic radical which contains: monocyclic aromatic hydrocarbon moieties, such as in 3,4,3',4'-benzephenonetetracarboxylic dianhydride, and especially pyromellitic dianhydride; fused polycyclic, e.g., bicyclic, aromatic hydrocarbon moieties, such as 1,4,5,8-naphthalenetetracarboxylic dianhydride; saturated carbocyclic moieties, such as in 1,2,3,4-cyclopentanetetracarboxylic dianhydride; heterocyclic moieties, e.g., having five to seven ring atoms, such as in 2,3,4,5-tetrahydrofurantetracarboxylic dianhydride; and cyclic moieties, e.g., hydrocarbyl moieties having five to 12 C atoms, such as in the dimaleic anhydride adduct of myrcene. Advantageously, the dianhydride is selected from the group consisting of 3,4,3',4'-benzephenonetetracarboxylic dianhydride, the dimaleic anhydride addition product of myrcene and especially pyromellitic anhydride.

The reacted moiety from the dianhydride desirably is present in the carboxylated polyester in at least 1 mole percent and up to about 15 mole percent, with about 4 mole percent up to about 12 being a preferred range.

The following Examples are included for a further understanding of the invention.

EXAMPLE 1

Poly(ethylene : 2-n-Butyl-2-ethyl-1,3-trimethylene Terephthalate 70:30) with 10 Percent Pyromellitic Dianhydride A mixture of 194 g. (1.0 mole) of dimethyl terephthalate, 83 g. (0.516 moles) of 2-n-butyl-2-ethylpropane-1,3-diol, and 74.5 g. (1.20 moles) of ethylene glycol is placed in a one liter three-neck stainless steel resin flask. The mixture (ester: total glycol — 1:1.7) is treated with 0.066 g. of zinc acetate dihydrate and 0.084 g. of antimony (III) oxide. The temperature is then maintained at 195°–225° C. until the theoretical amount of methanol formed in the ester exchange has distilled out (130 minutes). The distillation column is replaced by a solid receiver and a vacuum of 1.5–2.0 mm. is maintained for a 215-minute period while the temperature is slowly increased from 225° to 270° C. Heating is discontinued, the reaction flask is opened to an inert nitrogen atmosphere, and 21.8 g. (0.1 mole) of powdered pyromellitic dianhydride is added to the reaction mixture and stirred in the nitrogen atmosphere at 230° to 250° C. for 10 minutes. The dianhydride dissolves during this time. Upon cooling, the product is a clear, tough polyester having an inherent viscosity of 0.59. The inherent viscosity in this Example and reported elsewhere herein is measured in 100 ml. of a 1:1 phenol:chlorobenzene solvent mixture at 25° C. and employing 0.25 g. of polymer. The polymer is readily soluble in methylene chloride from which clear film can be cast.

EXAMPLE 2

Poly(ethylene : 2-n-Butyl-2-ethyl-1,3-trimethylene Terephthalate 70:30) with 2.5 Percent Pyromellitic Dianhydride Reaction was performed just as in Example 1, except 5.5 g. (0.025 mole) of pyromellitic dianhydride is added during the latter stages of the reaction. Inherent viscosity of the methylene chloride-soluble polymer is 0.63.

EXAMPLE 3

Poly(ethylene : 2-n-Butyl-2-ethyl-1,3-trimethylene Terephthalate 70:30) with 5 Percent Pyromellitic Dianhydride A mixture of 388 g. (2.0 moles) of dimethyl terephthalate, 165 g. (1.032 moles) of 2-n-butyl-2-ethylpropane-1,3-diol, and 149 g. (2.41 moles) of ethylene glycol is placed in a 1-liter three-neck stainless steel resin flask. The mixture (ester: total glycol — 2:3.4) is treated with 0.132 g. of zinc acetate dihydrate and 0.166 g. of antimony (III) oxide. The temperature is then maintained at 195°–225° C. until the theoretical amount of methanol formed in the ester exchange has distilled out (130 minutes). The distillation column is replaced by a solid receiver and a vacuum of 1.5–2.0 mm. is maintained for a 215-minute period while the temperature is slowly increased from 225° to 270° C. Heating is discontinued, the reaction flask is opened to an inert nitrogen atmosphere, and 11.54 g. (0.072 mole) of 2-n-butyl-2-ethylpropane-1,3-diol is added. This is allowed to react for 4 minutes at a temperature of 250° C. and is accompanied by a decrease in melt viscosity. At this time, 21.8 g. (0.1 mole) of powdered pyromellitic dianhydride is added to the reaction mixture and stirred in the nitrogen atmosphere at 230° to 250° C. for 10 minutes. The dianhydride dissolves during this time. Upon cooling, the product is a clear, tough polyester having an inherent viscosity of 0.42. The polymer is readily soluble in methylene chloride from which clear film can be cast.

EXAMPLE 4

Poly(ethylene : 2,2-Dimethyltrimethylene Terephthalate 70:30) with 2.5 Percent Pyromellitic Dianhydride Neopentyl glycol (0.3 mole percent of total glycol feed) is used to replace the 2-n-butyl-2-ethylpropane-1,3-diol in Example 1. The reaction is allowed to proceed as in Example 1 and 2.5 mole percent pyromellitic dianhydride is added after a high molecular weight of from 10,000–25,000 has been obtained. Inherent viscosity is 0.66.

EXAMPLE 5

Poly(ethylene Terephthalate : Isophthalate 70:30) with 2.5 Percent Pyromellitic Dianhydride A mixture of 272 g. (1.4 moles) of dimethyl terephthalate, 116 g. (0.6 mole) of dimethyl isophthalate, and 213 g. (3.44 moles) of ethylene glycol is treated with 0.132 g. of $Zn(OAc)_2 \cdot 2b8H_2O$ and 0.166 g. of $Sb_2O_3$. The polymer is prepared as in the preceeding Examples requiring 90 minutes at 190°–220° C. for the first stage and allowing the second stage 55 minutes at 1.0 mm. with the temperature rising to 285° C. the dianhydride (2.5 mole percent) is stirred with the polymer under nitrogen at 245° C. for 10 minutes. The inherent viscosity is 0.66 and the polymer is soluble in methylene chloride.

Example 6

Poly(ethylene : 2-n-Butyl-2-ethyl-1,3-trimethylene Isophthalate 80:20) with 2.5 Percent Pyromellitic Dianhydride A mixture of 388 g. (2.0 moles) of dimethyl isophthalate, 198 g. (3.2 moles) of ethylene glycol, and 128 g. (0.8 mole) of 2-n-butyl-2-ethylpropane-1,3-diol is treated with 0.13 g. $Zn(OAc)_2 \cdot 2b8H_2O$ and 0.17 g. $Sb_2O_3$. The polymer is prepared in the usual fashion with the first stage requiring 110 minutes at 195°–225° C. and the second stage consuming 215 minutes at 1.0 mm. with the temperature rising to 275° C. Heating is discontinued and pyromellitic dianhydride (2.5 mole percent) is stirred with the polymer under nitrogen at 245°–255° C. for 10 minutes. The inherent viscosity is 0.59 and the polymer is soluble in methylene chloride.

EXAMPLE 7

Poly(ethylene Isophthalate) with 2.5 Percent Pyromellitic Dianhydride
Polymer is prepared as in previous examples using:
388 (2.0 moles) dimethyl isophthalate,
248 (4.0 moles) ethylene glycol,
0.13 g. $(ZnOAc)_2 \cdot 2H_2O$, and
0.17 g. $Sb_2O_3$.
After the polymer attains a satisfactorily high molecular weight, 10.9 g. (2.5 mole percent) of pyromellitic dianhydride is added. The final product has an inherent viscosity of 0.63 and is soluble in methylene chloride.

EXAMPLE 8

Poly(ethylene : 2-n-Butyl-2-ethyl-1,3-trimethylene Naphthalene-2,6-dicarboxylate 80:20) with 2.5 Percent Pyromellitic Dianhydride A mixture of 305 g. (1.25 moles) of dimethyl 2,6-naphthalene-dicarboxylate, 107 g. (1.72 moles) of ethylene glycol, and 69 g. (0.43 mole) of 2-n-butyl-2-ethylpropane-1,3-diol is treated with 0.083 g. of $Zn(OAc)_2 \cdot 2H_2O$ and 0.10 g. of $Sb_2O_3$. The polymer is prepared as above, the first stage requiring 180 minutes at 195°–225° C. and the second stage 60 minutes at 1.0 mm. with the temperature rising to 270° C. Heating is discontinued, and the dianhydride (2.5 mole percent) is stirred with the polymer under nitrogen at 240° C. for 10 minutes. The inherent viscosity is 0.53 and the polymer is completely soluble in methylene chloride.

The polyesters listed in Table I below are made in a manner similar to the foregoing examples and are soluble in methylene chloride.

TABLE I

| Example | Polymer Ingredients | I.V. |
|---|---|---|
| 9 | ethylene glycol: 1,6-hexane diol (75:25) terephthalic acid 2.5 mole % pyromellitic dianhydride | 0.66 |
| 10 | ethylene glycol: 2-n-butyl-2-ethylpropane-1,3-diol (70:30) terephthalic acid 10 mole % pyromellitic dianhydride | 0.34 |
| 11 | ethylene glycol: neo pentyl glycol (40:60) terephthalic acid 2.5 mole % pyromellitic dianhydride | 0.70 |
| 12 | ethylene glycol: 2,2,4,4-tetramethyl-1,3-cyclobutane diol (65:35) terephthalic acid 2.5 mole % pyromellitic dianhydride | 0.49 |
| 13 | ethylene glycol: 1,4-cyclohexane dimethanol (65:35) terephthalic acid 2.5 mole % pyromellitic dianhydride | 0.59 |
| 14 | ethylene glycol: 3-methyl-2,2-norbornanedimethanol (75:25) terephthalic acid 10% pyromellitic dianhydride | 0.38 |
| 15 | ethylene glycol: polyethylene glycol of M.W. 400 (75:25) terephthalic acid 2.5 mole % pyromellitic dianhydride | 0.92 |
| 16 | ethylene glycol: polyethylene glycol of M.W. 1000 (75:25) terephthalic acid 2.5 mole % pyromellitic dianhydride | 0.79 |
| 17 | ethylene glycol: hydroxypivalyl hydroxypivalate (75:25) terephthalic acid 2.5 mole % pyromellitic dianhydride | 0.56 |
| 18 | ethylene glycol terephthalic acid: sebacid acid (60:40) 2.5 mole % pyromellitic dianhydride | 0.76 |
| 19 | ethylene glycol terephthalic acid: 1,3-cyclohexane-dicarboxylic acid (55:45) 2.5 mole % pyromellitic dianhydride | 0.59 |
| 20 | ethylene glycol terephthalic acid: dichloro-terephthalic acid (70:30) 2.5 mole % pyromellitic dianhydride | 0.49 |
| 21 | ethylene glycol terephthalic acid: 2,6naphthylene-dicarboxylic acid (60:40) 2.5 mole % pyromellitic dianhydride | 0.49 |
| 22 | ethylene glycol: neopentyl glycol (65:35) 2,6-naphthylenedicarboxylic acid 2.5 mole % pyromellitic dianhydride | 0.45 |
| 23 | ethylene glycol: neopentyl glycol (70:30) adipic acid 2.5 mole % pyromellitic dianhydride | – |
| 24 | ethylene glycol: 2-n-butyl-2-ethyl-propane-1,3-diol (70:30) 1,4-cyclohexanedicarboxylic acid 2.5 mole % pyromellitic dianhydride | 0.76 |

EXAMPLES 25–28

A series of polyesters are made as in Example 1 except that differing amounts of pyromellitic anhydride are employed and the polyesters are solution coated on a fully oriented polyethylene terephthalate film support from a solution containing 1 percent polymer, 3 percent resorcinol, 20 percent cyclohexanone, and about 76 percent methylene chloride and air dried at 240° to 250° F. the coating is then tested for adhesion after further coating thereon. first a standard mixed gelatin-cellulose nitrate subbing layer and then a standard gelatinous emulsion. The tape test is a standard test for adhesion whereby a strip of transparent pressure sensitive adhesive tape ("Scotch" tape) is applied across a torn edge of the coated material and then ripped free. The tape will carry along large amounts of emulsion from material having poor adhesion but little, if any, from material having very good adhesion. The wet and dry cycle test involves passing the coated material to be tested through a cycle of heating, wetting, and drying hundreds of times. This is a very severe test. The percent failure is an indication of the light transmission through the element or the amount of emulsion removed from the support. A zero percent failure would indicate no emulsion removed, etc. The results are shown in Table II.

TABLE II

| Example | Mole % of dianhydride | I.V. | Tape test | 6-hour wet and dry cycle adhesion |
| --- | --- | --- | --- | --- |
| 25 | 1.25 | 0.63 | Very good | 3% Failure |
| 26 | 2.5 | 0.59 | " | 5% Failure |
| 27 | 5.0 | 0.59 | " | 4% Failure |
| 28 | 10.0 | 0.52 | " | 22% Failure |

EXAMPLES 29–31

A series of polyesters is made as in Example 1 using 30 ethylene glycol and 2-n-butyl-2-ethyl-1,3-propanediol in a ratio of 70:30, dimethyl terephthalate, and 4 mole percent of various anhydrides as shown in Table III. The polyesters are coated and tested as in Examples 25–28. They show good adhesion, but noticeably less than is obtained with polymers containing the same amount of pyromellitic acid.

TABLE III

| Example | Dianhydride | I.V. | Tape test |
| --- | --- | --- | --- |
| 29 | 3,4,7',4'-benzophenone-tetracarboxylic dianhydride | 0.52 | Fair |
| 30 | 1,2,3,4-cyclopentane-tetracarboxylic dianhydride | 0.45 | Fair |
| 31 | dimaleic anhydride adduct of myrcene | 0.42 | Good |

EXAMPLE 32

One percent of carboxylated polyester of Example 4 is dissolved in a mixture of 3 percent resorcinol, 20 percent cyclohexanone and 74 percent methylene chloride. A trace amount (0.1 percent) of Nigrosine dye is present to facilitate the identification of the site of adhesion failure. This solution is then applied to fully oriented polyethylene terephthalate ("Estar") support and air dried at 240° to 250+ F. Over this carboxylated polyester coat is applied a mixed gelatin-cellulose nitrate sub. The organic solvent mixture for this gelatin-cellulose nitrate sub is 20 percent acetone, 45 percent ethylene chloride, 2.5 percent water, and 30.5 percent methyl alcohol. This sub was then dried at 250° to 260° F. The subbed element is then coated with a conventional gelatino silver halide emulsion and adhesion is tested as before. The emulsion coated support rates very good in the tape test and shows about 8 percent failure in the 6-hour wet and dry cycle adhesion test.

A control sample, a commercial photographic element having cellulose acetate support, cellulose nitrate-gelatin subbing layer, gelatino silver halide emulsion is tested in a similar manner and shows about 2 percent failure in the wet and dry adhesion test and rates very good in the tape test.

EXAMPLE 33

Example 32 is followed except that 6 percent resorcinol is used instead of 3 percent resorcinol. The resultant coated emulsion rates very good in the tape test and shows only about 2 percent failure in the wet and dry adhesion test.

EXAMPLE 34

The procedure according to Example 33 is followed except that the polymer is a poly(ethylene : neopentylene terephthalate 40:60) modified with 10 mole percent pyromellitic dianhydride. The resulting emulsion coated support rates excellent in the tape test and shows only about 1 percent failure on the 6-hour wet and dry cycle adhesion test.

EXAMPLE 35

The procedure according to Example 34 is followed except that about 3 percent 1-naphthol is utilized as an adhesion promoter in place of the 6 percent resorcinol. The resulting emulsion coated support rates fair in the tape test and shows 3 percent failure in the wet and dry adhesion test.

EXAMPLE 36

The procedure according to Example 34 is followed except that 20 percent acetone is substituted for the 20 percent cyclohexanone. The resultant emulsion coated support rates excellent in the tape test and shows 3 percent failure in the wet and dry adhesion test.

EXAMPLE 37

The procedure according to Example 34 is followed except that a gelatin subbing is used instead of the gelatin-cellulose nitrate mixture. The resultant emulsion coated support rates fair in the tape test and shows 3 percent failure in the wet ad dry cycle adhesion test.

EXAMPLE 38

The procedure according to Example 34 is followed except that 6 percent catechol is substituted for the 6 percent resorcinol. The resultant emulsion coated support rates fair to poor on the tape test and shows 11 percent failure on the wet and dry cycle adhesion test.

The polyester substrate to which the carboxylated polyester adheres is an oriented polyester film such as a polymer of terephthalic or isophthalic acid or their mixtures or cyclohexanedicarboxylic acid with ethylene glycol, 1,4-cyclohexanedimethanol and the like. In general, the polyester comprises the linear polymer reaction product of an organic diacid and an organic diol capable of being fabricated into tough film.

The photographic emulsion carried on the polyester support is of the conventional gelatin containing type wherein silver halide or other light sensitive compound is distributed in a binder of gelatin or gelatin in admixture with another compatible binder such as gelatin derivatives, polyvinyl compounds, cellulose derivatives, acrylamide polymers, polyvinyl pyrrolidone, polysaccharides such as dixtran, gum arabic and the like.

The described photographic emulsions and other layers of a photographic element employed in the practice of the invention can also contain other dispersed polymerized vinyl compounds, particularly those which increase the dimensional stability of photographic materials. Suitable synthetic polymers include those described, for example, in U.S. Pat. Nos. 3,142,568 of Nottorf, issued July 28, 1964; 3,193,386 of White, issued July 6, 1965; 3,062,674 of Houck, Smith and Yudelson, issued Nov. 6, 1962; 3,220,844 of Houck, Smith and Yudelson, issued Nov. 30, 1965; 3,287,289 of Ream and Fowler, issued Nov. 22, 1966; and 3,411,911 of Dykstra; and include, for example, the water-insoluble polymers of alkylacrylates and methylacrylates, acrylic acid, sulfoalkylacrylates or methacrylates and the like.

While the photographic layer may be adhered to the support directly by the carboxylated polyester subbing layer, it is usually desirable to interpose a conventional gelatin-cellulose ester subbing layer, such as a gelatin-cellulose nitrate layer between the sensitized layer and the carboxylated polyester layer. The amount of cellulose nitrate in the subbing layer is generally between 25 and 75 percent by weight based on the weight of gelatin and cellulose nitrate and is preferably about 50 percent by weight. The layer is conveniently applied from an aqueous solution of one or more organic solvents.

The carboxylated polyester is advantageously applied to a fully oriented polyester support from solution in one or more organic solvents, desirably relatively nonflammable. Easily vaporized suitable solvents include ketonic solvents such as cyclohexanone, acetone, etc.; and halogenated hydrocarbon solvents such as methylene chloride. Mixtures of ketonic solvents and halogenated hydrocarbon solvents are especially useful. In a preferred embodiment the coating solution contains about 15 to about 25 percent cyclohexanone and about 65 to 80 percent methylene chloride. In an especially advantageous embodiment of the present invention the coating solution also contains an adhesion promoting (attack) solvent. The selection of the adhesion promoter will normally depend on the particular dianhydride modified polyester, the particular solvent system, etc. utilized in any given system. Although resorcinol has remarkable versatility in this respect, other hydroxyphenol solvents are considered to give satisfactory results. Examples of other solvents considered suitable include orcinol, catechol, pyrogallol, 1-naphthol, 2,4-dinitrophenol, 2,4,6-trinitrophenol, 4-chlororesorcinol, 2,4dihydroxy toluene, 1,3-naphthalenediol, acrylic acid, the sodium salt of 1-naphthol-4-sulfonic acid, benzyl alcohol, trichloroacetic acid, o-hydroxybenzotrifluoride, m-hydroxybenzotrifluoride, o-fluorophenol, m-fluorophenol, p-fluorophenol, chloral hydrate, and o-cresol. Mixtures of two or more adhesion promoters can be employed if desired. The adhesion promoter usually comprises at least about 3 weight percent of the total solution, normally about 3 to about 10 weight percent, advantageously 5 to 8 percent.

The amount of carboxylated polyester in the coating solution is usually less than 25 weight percent based on the weight of the solution and preferable from 0.5 to 2 weight percent. Thus, soluble polyesters according to the present invention are soluble in the selected solvent, e.g., methylene chloride, or desirably cyclohexanone-methylene chloride mixture, to at least 0.5 weight percent. The layer is coated on the polyester substrate in conventional apparatus to a thickness sufficient to ensure a substantially complete coating over the substrate. A thin layer is preferable to minimize thickness and waste and, in general, the layer is not more than 0.01 inches. The coated layer may be air dried at room temperature or in heated air.

By providing a solvent soluble carboxylated polyester as described, it is possible to obtain excellent adhesion of gelatin-containing layers to a polyester support.

The invention has been described in detail with particular reference to preferred embodiments thereof, but it will be understood that variations and modifications can be effected within the spirit and scope of the invention.

We claim:

1. A photographic element comprising a polyester support, a gelatin-cellulose ester photographic subbing layer, a gelatino-silver halide emulsion layer on said gelatin-cellulose ester layer and an organic solvent-soluble carboxylated polyester subbing layer bonding said gelatin-cellulose ester layer to said polyester support, said carboxylated polyester being the reaction product of an organic solvent soluble polyester and from 1 to about 15 mole percent of an organic dianhydride.

2. A photographic element according to claim 1 wherein said organic dianhydride is selected from the group consisting of pyromellitic dianhydride, 3,4,3',4'-benzophenonetetracarboxylic dianhydride, 1,2,3,4-cyclopentanetetracarboxylic dianhydride and the dimaleic anhydride adduct of myrcene.

* * * * *

PO-1050
(5/69)

UNITED STATES PATENT OFFICE
CERTIFICATE OF CORRECTION

Patent No. 3,658,541          Dated April 25, 1972

Inventor(s) Frederick J. Jacoby et al

It is certified that error appears in the above-identified patent and that said Letters Patent are hereby corrected as shown below:

1. In column 5, line 15, delete "$2b8H_2O$" and insert --$2H_2O$--

2. In column 5, line 31, delete "$2b8H_2O$" and insert --$2H_2O$--

3. In column 7, line 26, following "using", delete "30"

4. In column 7, line 54, following "250", delete "+" and insert --o--

Signed and sealed this 12th day of September 1972.

(SEAL)
Attest:

EDWARD M. FLETCHER, JR.
Attesting Officer

ROBERT GOTTSCHALK
Commissioner of Patents